Aug. 7, 1934.  J. A. WEST  1,969,052
DIRECTION INDICATOR
Filed June 19, 1933
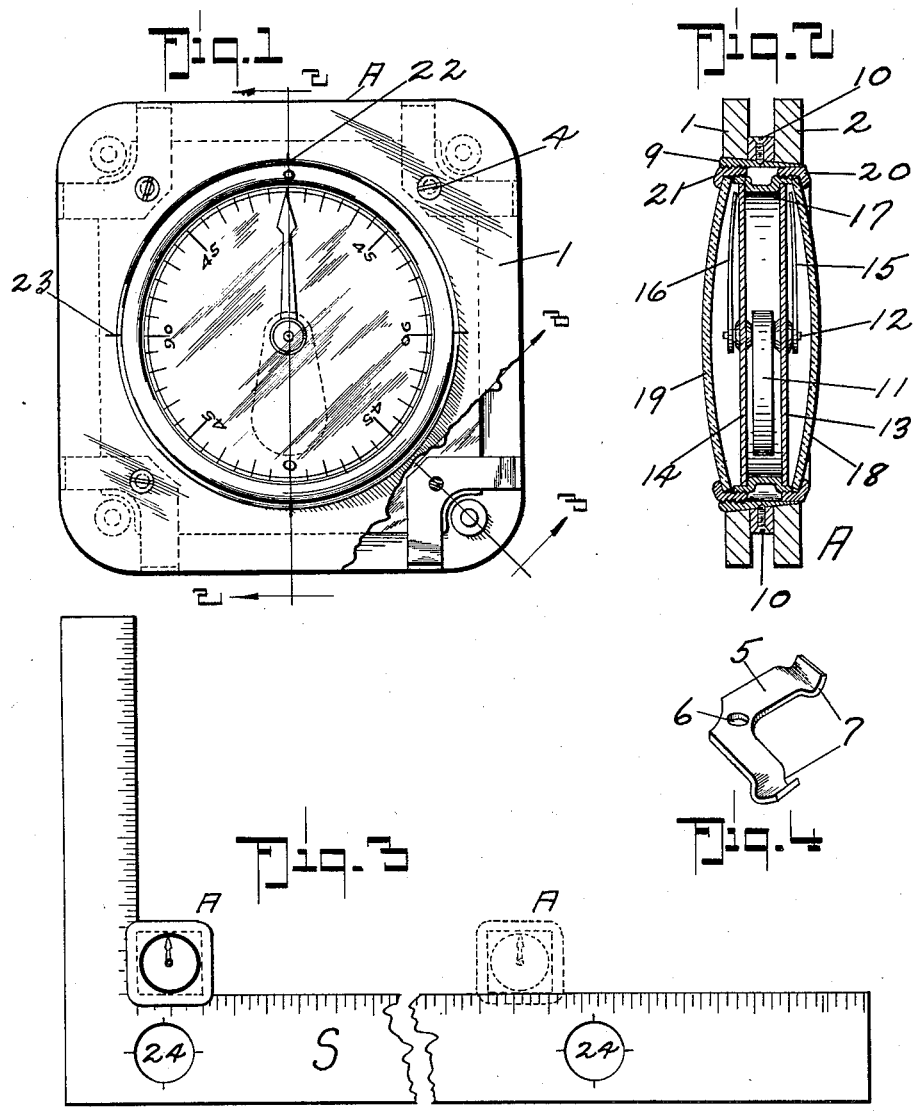
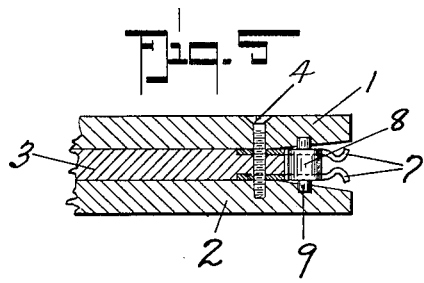
Josef August West
Inventor
Herbert E. Smith
By
Attorney Patented Aug. 7, 1934

1,969,052

UNITED STATES PATENT OFFICE 1,969,052

DIRECTION INDICATOR

Josef August West, Kellogg, Idaho

Application June 19, 1933, Serial No. 676,486

2 Claims. (Cl. 33—215)

My present invention relates to an improved direction indicator of the pendulum type, for use in combination with straight-edge geometrical instruments, for leveling, grading, and plumbing operations. The direction indicator of my invention may be a pocket-instrument, or tool-box device, that is applicable for use in combination with geometrical instruments having one or more straight edges, as for instance a T-square, an angle, a straight-edge bar or plate, or, as illustrated in the drawing, a carpenter's square, and the indicator may be utilized by mechanics, farmers, irrigation engineers, and others. As an example of a specific use of the direction indicator, it is useful to irrigators in establishing grades with a straight-edge, when laying out irrigation ditches and laterals therefrom, but of course many other problems of this nature may be solved quickly and accurately by the use of the direction indicator in combination with an appropriate straight-edge.

In carrying out my invention I employ an instrument of rectangular shape, preferably square, having a circular, double-face, dial, and dual pointers or needles of the pendulum type, and means are employed for slidably mounting the instrument upon a straight-edge for use therewith.

Means are utilized for setting or adjusting the dials to a predetermined position with relation to permanent perpendicular and horizontal lines or gages on the instrument, to facilitate the successive finding of a number of similar slopes or grades, as in the location of irrigation ditches or laterals.

Means are also provided for convenience and accuracy in the application of the instrument to the straight edge, and to facilitate shifting or sliding of the instrument with relation to the straight-edge.

The invention consists in certain novel combinations and arrangements of parts in the construction of the direction indicator as will be more clearly set forth hereinafter, and claimed.

In the accompanying drawing I have illustrated one complete example of the physical embodiment of my invention wherein the parts are combined and arranged according to one mode I have thus far devised for the practical application of the principles of my invention, but it will be understood that changes and alterations may be made in this exemplified structure, within the scope of my appended claims, without departing from the principles of my invention.

Figure 1 is a plan view or face view of a direction indicator embodying my invention, one corner of the instrument being broken away to disclose a roller and one of the fastening clips.

Figure 2 is a transverse sectional view at line 2—2 of Figure 1.

Figure 3 is a view showing the instrument or direction indicator attached to a square, and showing by dotted lines a second position of the instrument on the straight edge of the square.

Figure 4 is a detail perspective view of one of the angular spring, attaching clips, one pair of the angular clips being employed at each corner of the instrument.

Figure 5 is an enlarged, sectional detail view at line 5—5 of Figure 1.

In the preferred form of the invention as shown in the drawing I have designated the instrument as a whole by the letter A and this includes a rectangular block or stock comprising two outer, spaced plates 1 and 2 of suitable material, having rounded corners and open centers, and the plates form the sides of the holder portion of the instrument. Between the two side plates 1 and 2 of the holder an intermediate spacing plate or filler 3 is retained by means of screws 4 that pass through one side plate and the intermediate plate and enter the other side plate, as best seen in Figure 5.

The stock or block made up of the layers or plates 1, 2, and 3, forms an open center holder for the other parts of the direction indicator, and as indicated especially in Figures 2 and 5 this holder has a groove about its square periphery, which groove is bounded by the two side plates 1 and 2 and the inner spacing plate 3, so that the grooved instrument A may be slipped over the straight edge of a geometrical instrument, such as a carpenter's square S in Figure 3. Any one of the four grooved side edges of the holder may be used in combination with the straight edge, or two side edges of the holder may be employed with two angular straight edges, as indicated in Figure 3, by dotted lines and full lines.

At the four corners of the rectangular holder are arranged four pairs of angular attaching clips as 5, fashioned of resilient metal in the shape indicated in Figures 1 and 4. Each clip has a hole 6 for a screw 4, and the angular ends of the clips terminate in spring jaws 7, 7. As best seen in Figure 5 the clips are arranged in pairs and inserted in between the inner spacing plate 3 and the two side plates 1 and 2 of the holder or stock, and the screws 4 retain the pairs of clips in rigid position. By their location at the corners of the holder, the pairs of clips provide two spaced complementary pairs of resilient jaws 7 at each of the four sides of the holder, and any one of the four sides of the holder may thus be employed for frictionally engaging the direction indicator on, or attaching it to, a straight-edge, and the two pairs of spring jaws hold the instrument in position on the straight edge.

To insure accurate engagement of the direction indicator with the straight edge, and to avoid direct contact of the holder with grit, dust, dirt, &c on the straight edge that would otherwise prevent accurate sliding contact with the straight edge, I provide at each corner of the holder an anti-friction roller 8 having trunnions 9 that are journaled in sockets in adjoining inner faces of the plates 1 and 2. As indicated in the drawing the rollers are located in the grooves of the side edges of the holder or stock, and the outer peripheries of the rollers project outwardly beyond the outer edges of the spacing plate 3, so that the outer edge of the plate 3 will not contact with the straight edge, but the straight edge will be engaged by the two rollers at adjoining corners of the stock or holder.

Within the slightly tapered, circular, open center of the holder is mounted a wedge ring 9, and this ring is fixed in adjusted position within the open center holder by means of a number of set screws 10, that are threaded through the spacing plate 3, from its outer edge or edges to engage the outer periphery of the wedge ring. This adjustable wedge ring forms the base or support for the pendulum structure, and the whole structure, including the wedge ring may be turned within the holder, after screws 10 are loosened, with the center of the direction indicator as the axis of rotation, for the purpose of setting or adjusting the pendulum structure or indicator in the holder.

The weight 11, which forms part of the pendulum, is pivoted by its trunnions 12 in the side walls 13 and 14 of an inclosing, circular casing, and the two needles or pointers 15 and 16 mounted on the trunnions and rigid with the weight, but exterior of the casing, co-act with the degree marks that form the dials on the outer faces of the two side walls 13 and 14. An inset rim 17 forms the circumferential wall of the dial-case, and this rim has exterior, oppositely extending flanges that form seats for the two circular lenses or glass panels 18 and 19 for the dials.

Two exterior retaining rings 20 and 21 hold the dial-case in position within the enclosing wedge ring, the ring 20 being provided with internal screw threads to engage complementary external threads on the flanged rim, and the ring 21 having external threads complementary to internal threads on the wedge ring.

It will be understood of course that the pendulum indicator swings on the trunnions 12, and the pointers or needles 15 and 16 indicate on the dials 13 and 14 the degree of angularity.

The holder is provided with diametrically arranged gage marks 22 and 23, forming fixed perpendicular and horizontal lines on the holder, and normally, the zero marks of the dials coincide with the perpendicular gage marks 22. Thus, in adjusting the indicator in its holder, the upper zero mark in Figure 1 may be turned to the right or left of the perpendicular mark 22 to indicate a predetermined degree of rise or fall of an irrigation ditch, and by the use of the adjusted indicator in combination with a straight edge this inclination may be maintained, uniformly, with the adjusted indicator, in laying out or grading the ditch.

It will be apparent that if the longer leg of the carpenter's square in Figure 3 were a straight edge of suitable length, and with the direction indicator mounted on the upper edge of the straight edge or bar, as indicated by dotted lines in Figure 3, the rise or fall of a grade can readily be determined by reference to the pointer of the pendulum.

When the indicator is mounted on the longer leg of the square S, the desired tilt or inclination of this leg may be indicated by the pointer or pointers, and of course the straight edge may be leveled in accordance with the position of the pointer on the dial.

For plumbing an upright object, the shorter or upright leg of the square S is placed against the object, and the direction indicator is used on the upright straight edge of the square in Figure 3.

Under some circumstances, the indicator may be removed from its holder or stock, and seated in one of the circular holes 24, 24, of the square in Figure 3, and these holes are provided with permanent perpendicular and horizontal gage lines similar to those on the stock or holder for correct adjustment of the direction indicator in the blade or leg of the square.

From the above description taken in connection with my drawing it will be apparent that I have devised an instrument that is comparatively simple in construction and operation, and one that may be relied upon for correct and accurate findings that are useful in solving numerous problems encountered by mechanics, artisans, engineers, and others.

Having thus fully described my invention, what I claim as new and desire to secure by Letters Patent is:—

1. In a direction indicator the combination with a rectangular holder comprising side plates and an intermediate plate of reduced dimensions to form grooved edges, of contact rollers journaled in the side plates at the corners of the holder and located within the grooved edges for contact with a straight edge, means disposed at opposite sides of each roller for clasping the opposite faces of the straight edge, and fastening screws passing through said plates and clasping means.

2. In a direction indicator, the combination with a rectangular holder comprising side plates and an intermediate plate of reduced dimensions to form grooved edges, of contact rollers journaled in the side plates at the corners of the holder and located within the grooved edges for contact with a straight edge, a pair of flat angular clips secured in each corner between adjoining plates, resilient jaws on each clip for clasping opposite faces of the straight edge, and fastening screws passed through said plates and clips.

JOSEF AUGUST WEST.